April 18, 1933.   B. W. ST. CLAIR   1,904,095
ELECTRICAL MEASURING INSTRUMENT
Filed April 16, 1931
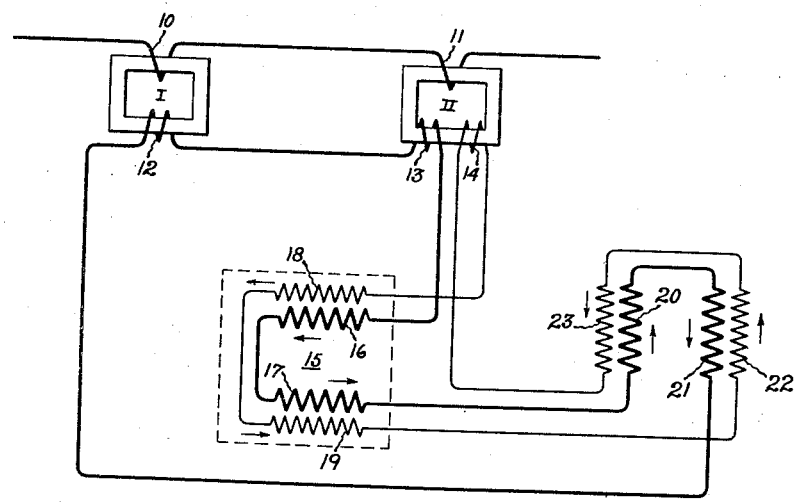
Inventor:
Byron W. St. Clair,
by Charles V. Allen
His Attorney.

Patented Apr. 18, 1933

1,904,095

UNITED STATES PATENT OFFICE

BYRON W. ST. CLAIR, OF LYNN, MASSACHUSETTS, ASSIGNOR TO GENERAL ELECTRIC COMPANY, A CORPORATION OF NEW YORK

ELECTRICAL MEASURING INSTRUMENT

Application filed April 16, 1931. Serial No. 530,604.

My invention relates to electrical measuring instruments and more particularly to the neutralization of the voltage produced in the circuit thereof due to mutual inductance.

In measuring electrical power it is common practice to use a transformer so proportioned as to provide relatively small current for the measuring instrument. The accuracy of the readings depends on the maintenance of constant ratio and constant phase angle in the transformer. One highly successful transformer system which will keep these two factors constant over varying operating conditions is disclosed in Brooks Patent 1,357,197. Briefly, the Brooks system comprises a current transformer which yields a secondary current of desired magnitude and approximately correct in phase angle. A second transformer is also provided with primary and secondary windings in series with the corresponding windings on the first transformer but the second transformer is reversed with respect to the secondary on the first transformer. On the second transformer the ratio of secondary turns to primary turns is exactly equal to the desired ratio of primary current to secondary current. There is also provided on the second transformer or the second stage a tertiary winding which provides corrective current for the wattmeter. This corrective current is applied to the measuring instrument through auxiliary field coils.

In the past these auxiliary coils could not be interwound with the field coils of the measuring instrument because of the mutual inductance arising between the two and the consequent interchange of energy. When the power factor was low the interchange of energy unbalanced the system so that accurate readings were impossible. Therefore, to preserve the accuracy of the system the coils were separated by using a polyphase wattmeter with the usual two armatures spaced apart on the shaft. The auxiliary coils were placed in inductive relation to one armature while the field coils were inductively arranged about the other armature thus diminishing the effect of the mutual inductance.

Accordingly, an object of my invention is to provide a single armature indicating wattmeter which is accurate for low power factors.

A further object of my invention is to provide a compact wattmeter which is extremely accurate for low power factors.

A further object of my invention is to eliminate the inaccuracies introduced due to an interchange of energy between field coils and auxiliary coils of a measuring instrument.

My invention will be better understood from the following description taken in connection with the accompanying drawing wherein I have illustrated a schematic arrangement of apparatus embodying my invention.

Referring now to the drawing, transformers I and II form the first and second stages of a Brooks transformer system. The single turn primary windings 10 and 11 are connected in series. The secondary windings 12 and 13 have the same number of turns but the current flow through winding 13 is reversed with respect to winding 12.

There is also provided on transformer II a tertiary winding 14. It may be demonstrated that the current induced in winding 14 is just sufficient to correct for ratio and phase relation errors introduced in changes in frequency, changes in impedance, or changes in current in the secondary circuit, magnetizing current, and so forth. For further description of the transformer system which forms no part of the present invention, reference may be had to the Brooks patent above referred to. Wattmeter 15 of the indicating type is provided with the usual field coils 16 and 17 and interwound therewith are auxiliary coils 18 and 19 which carry current from tertiary winding 14. The direction of current flow indicated by the arrows is the same in coils 16 and 18, and 17 and 19, respectively.

Since the auxiliary coils are interwound with the respective field coils, considerable mutual inductance exists between the two. For low power factors the accuracy of an uncompensated meter is so materially diminished by this mutual inductance as to result in an impractical instrument. However, by placing in series with the field coils 16 and 17 and auxiliary coils 18 and 19, coils 20, 21 and 22, 23, respectively, and reversing the relative direction of current flow through these coils, I may counteract the effect of this mutual inductance. Accordingly, the same number of turns are used in coil 20 as in coil 16; 21 as in 17; 22 as in 18, and 23 as in 19. The connections are made so that the current flows in opposite directions, as indicated by arrows, through coils 21 and 22; also in 20 and 23. The extra set of coils 20, 21, 22 and 23 are located outside of the wattmeter case and are preferably disposed at right angles to the field coils of the instrument. The compensating coils 20, 21, 22 and 23 add a voltage opposed to the voltage of mutual inductance due to the field coils and auxiliary coils. I have found that with this arrangement the mutual inductance effect between the field coils and the auxiliary coils has been reduced to 0.000021 henrys, which is negligible.

While the embodiment of the invention illustrated in the drawing has been described with considerable particularity, it is to be expressly understood that the invention is not limited thereto, as the invention might be carried out in a variety of ways, some of which will now readily suggest themselves to those skilled in the art. Reference is therefore to be had to the claims hereto appended for definition of my invention.

What I claim as new and desire to secure by Letters Patent of the United States, is:—

A wattmeter including field coils, auxiliary coils interwound therewith, a duplicate set of said coils in circuit therewith located in non-inductive relation to said first coils, the direction of current in said duplicate coils being such that the voltage due to the mutual inductance in said coils is of the same magnitude but of opposite sign to the voltage due to the mutual inductance of said first mentioned coils, whereby the effect of mutual inductance in the circuit is neutralized.

In witness whereof, I have hereunto set my hand.

BYRON W. ST. CLAIR.